(12) United States Patent
Ford et al.

(10) Patent No.: US 7,658,409 B2
(45) Date of Patent: Feb. 9, 2010

(54) DRIVER SIDE AIR BAG

(75) Inventors: Brian C. Ford, Mt. Clemens, MI (US); Thomas G. Busacca, Shelby Township, MI (US); Robert Arwood, Fraser, MI (US)

(73) Assignee: Key Safety Systems, Inc, Sterling Heights, MI (US)

( * ) Notice: Subject to any disclaimer, the term of this patent is extended or adjusted under 35 U.S.C. 154(b) by 254 days.

(21) Appl. No.: 11/751,093

(22) Filed: May 21, 2007

(65) Prior Publication Data

US 2008/0290640 A1    Nov. 27, 2008

(51) Int. Cl.
*B60R 21/16* (2006.01)

(52) U.S. Cl. .................................. 280/743.2; 280/731

(58) Field of Classification Search .................. 280/731, 280/743.2
See application file for complete search history.

(56) References Cited

U.S. PATENT DOCUMENTS

| | | | |
|---|---|---|---|
| 6,209,911 B1 | 4/2001 | Igawa et al. | |
| 6,598,903 B2 | 7/2003 | Okada et al. | |
| 6,648,366 B2 | 11/2003 | Dillon et al. | |
| 6,929,285 B2 | 8/2005 | Yamada et al. | |
| 7,452,002 B2 * | 11/2008 | Baumbach et al. | 280/743.2 |
| 2002/0056978 A1 * | 5/2002 | Keshavaraj | 280/743.2 |
| 2005/0212276 A1 * | 9/2005 | Yamada | 280/743.2 |
| 2006/0197329 A1 * | 9/2006 | Asano et al. | 280/743.1 |
| 2007/0108753 A1 * | 5/2007 | Pang et al. | 280/743.2 |
| 2007/0200320 A1 * | 8/2007 | Keshavaraj | 280/730.1 |
| 2007/0200329 A1 * | 8/2007 | Ma | 280/743.1 |
| 2007/0210568 A1 * | 9/2007 | Thomas et al. | 280/743.2 |
| 2007/0222189 A1 * | 9/2007 | Baumbach et al. | 280/730.1 |
| 2007/0246920 A1 * | 10/2007 | Abele et al. | 280/730.1 |
| 2007/0278774 A1 * | 12/2007 | Ishiguro et al. | 280/740 |
| 2008/0007038 A1 * | 1/2008 | Fischer et al. | 280/743.2 |
| 2008/0036188 A1 * | 2/2008 | Gould et al. | 280/739 |
| 2008/0073890 A1 * | 3/2008 | Williams et al. | 280/739 |
| 2008/0079246 A1 * | 4/2008 | Dix | 280/730.2 |
| 2008/0217892 A1 * | 9/2008 | Maripudi et al. | 280/740 |

FOREIGN PATENT DOCUMENTS

KR    10-2003-0074408 A    9/2003

* cited by examiner

*Primary Examiner*—Paul N. Dickson
*Assistant Examiner*—Barry Gooden, Jr.
(74) *Attorney, Agent, or Firm*—Markell Seitzman

(57) ABSTRACT

An air bag usable to protect the driver of the vehicle comprising: a face panel; a rear panel of generally the same shape as the face panel and secured to the face panel along its periphery; the rear panel including a centrally located opening configured to receive an air bag inflator that introduces gas into the space formed by the face and rear panels; a tether of elongated shape having first and second ends and a center region, the center region is positioned into a Z-shaped configuration and secured to the face panel proximate a geometric center of the face panel.

10 Claims, 5 Drawing Sheets

DRIVER SIDE AIR BAG

BACKGROUND AND SUMMARY OF THE INVENTION

The present application generally relates to driver side air bag systems and, in particular, to an air bag having an internal tether and its method of construction.

The present invention comprises: an air bag to protect the driver of a vehicle having a face panel, a rear panel secured to the face panel along its periphery, the rear panel including a centrally located opening configured to receive an air bag inflator, and an inflator introducing gas into the space between the face and rear panel. A tether, internal to the air bag, has a Z-fold configuration secured to the face panel and first and second ends secured to the rear panel. The invention also includes a method of manufacture in which the tether is first secured to the rear panel, followed by the panels being secured to each other and, finally, the Z-fold configuration formed and attached to the face panel.

The benefits of the present invention in relation to the prior art are the use of a smaller sized tether, which results in less material usage, reduced sewing and a smaller final cushion pack.

DETAILED DESCRIPTION OF THE DRAWINGS

Figure 1:
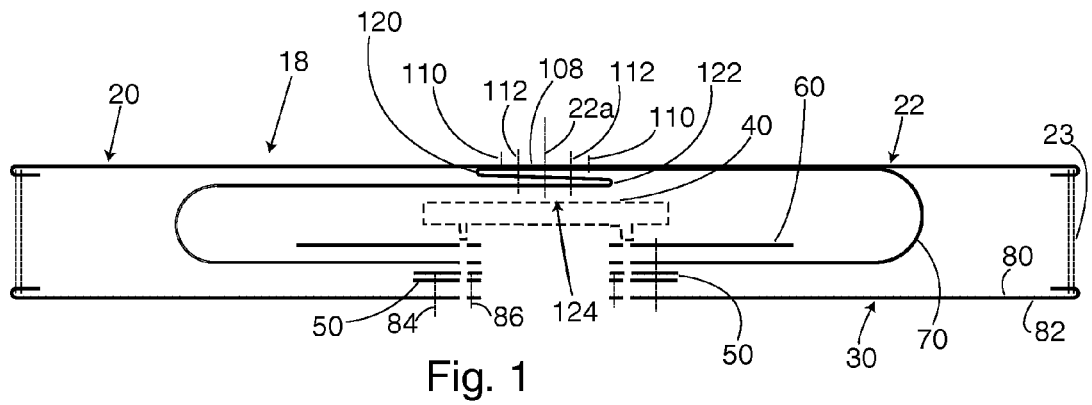
FIG. 1 is a diagrammatic cross-sectional overview of the driver side air bag.
Figure 2:
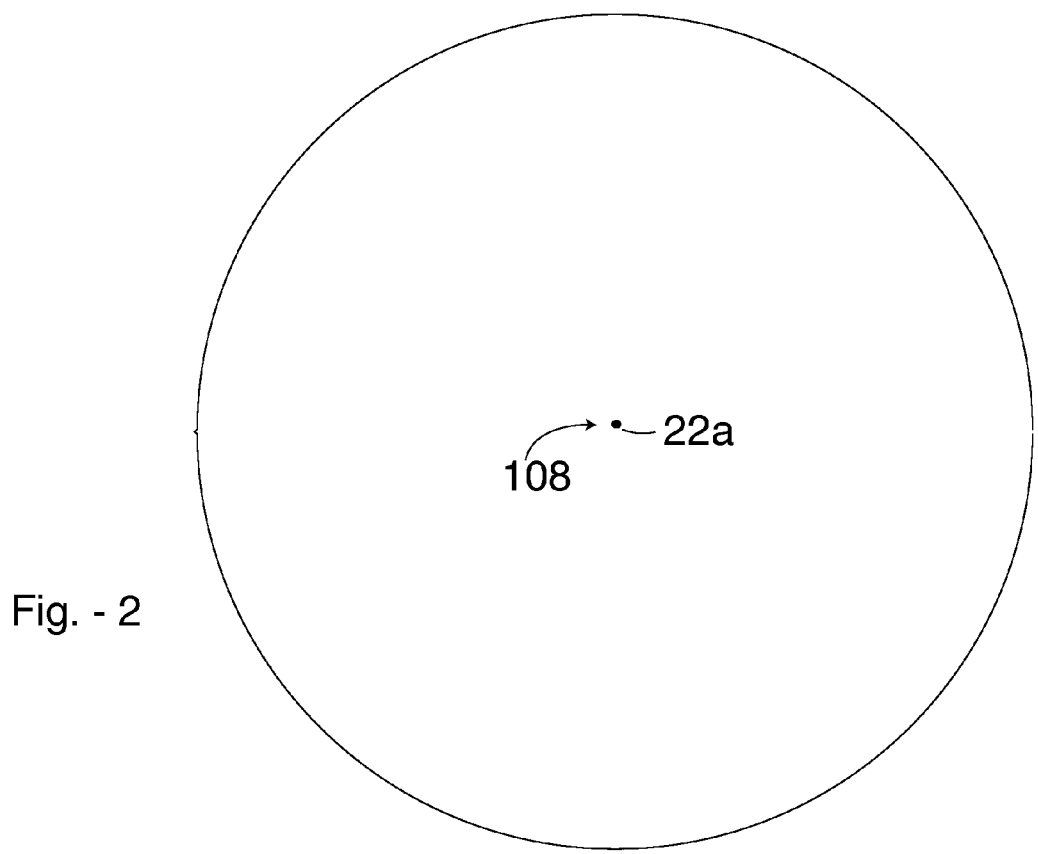
FIGS. 2 and 3 show each of the five major components of the air bag.
Figure 3:
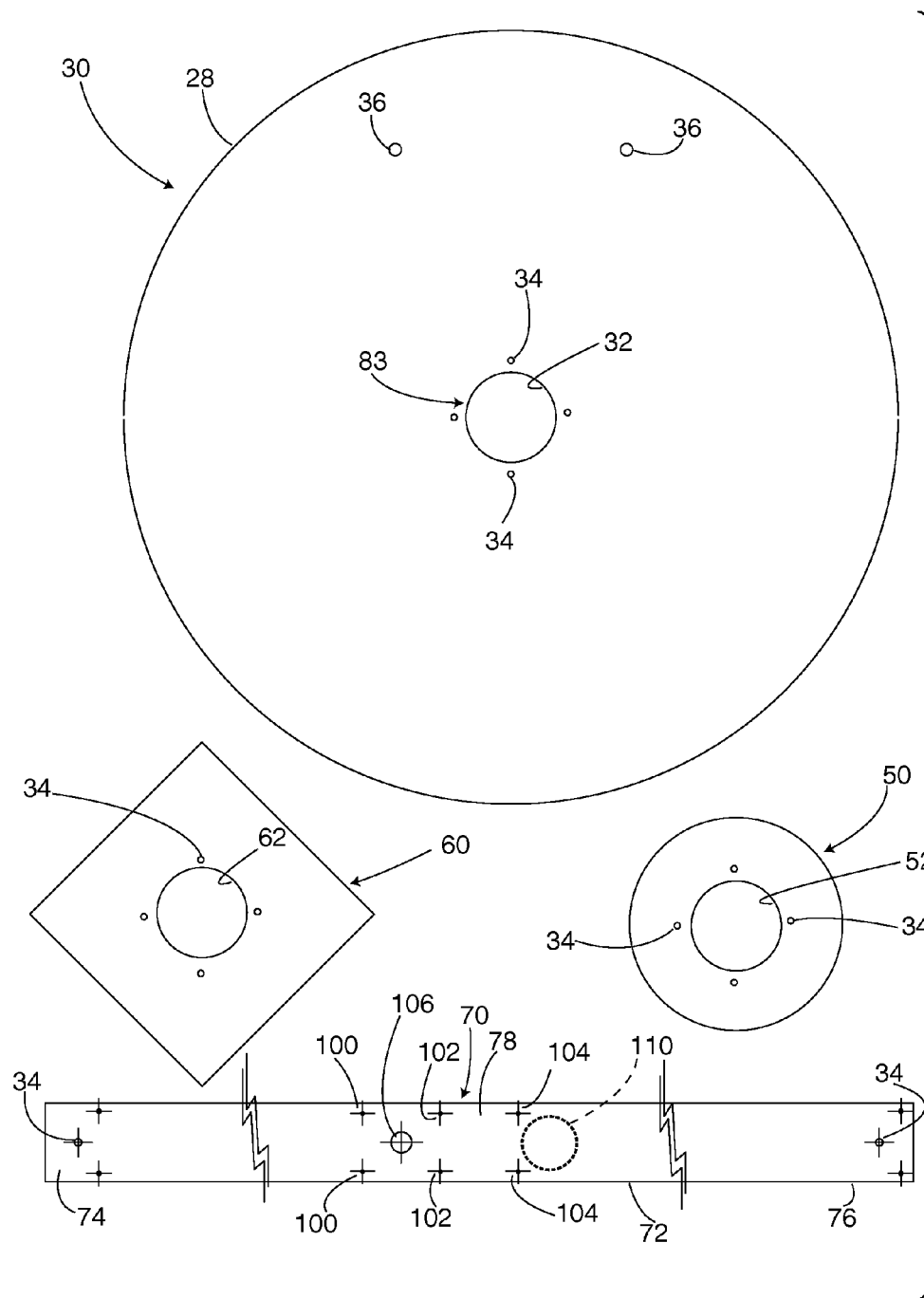

Reference is made to FIGS. 1, 2 and 3, which illustrate a driver side air bag 20 comprising a generally circular face panel 22, a complementary shaped rear panel 30, at least one (even though two are shown) circular reinforcement panels 50, a rectangular (square) heat shield 60 and a tether 70. Each of the panels is typically fabricated of a woven material and, as needed, coated to control permeability or to increase the flame retardant capacity of the particular panel.

Figure 1A:
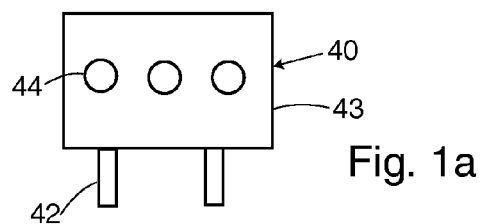
FIG. 1a diagrammatically shows an inflator.

Each of the face panel and rear panel includes a peripheral edge 26 and 28 respectively. The rear panel 30 includes a central opening 32 sufficient to receive an air bag inflator 40, shown in phantom line in FIG. 1. The air bag and inflator comprise a driver-side air bag module 18. The inflator 40, shown diagrammatically in FIG. 1a, is of conventional construction having a plurality of threaded studs or fasteners 42 that extend downwardly from the main body 43. The main body of the inflator includes a plurality of exit ports 44 through which inflation gas enters into the air bag.

The rear panel 30, see FIG. 3, additionally includes a plurality of mounting openings 34 to receive a selected one of the inflator studs or fasteners 42. Rear panel 30 also includes two openings, vents or ports 36 that are oriented toward the top of the rear panel 30 and face away from the occupant to be protected.

The reinforcement panels 50 also include a central opening 52. The heat shield 60, which also functions as a reinforcement panel, includes a central opening 62. The heat shield 60 is coated with a flame retardant material such as neoprene, silicone or polyethylene or poly-vinyl chloride. A coated heat resistance panel such as 62 can be replaced by an uncoated sacrificial layer or panel or material depending on the performance characteristics of the inflator. While two reinforcement panels are used in the illustrated embodiment, the number can vary as needed. Openings 32, 52 and 62 are substantially the same size and in the complete air bag are all in alignment.

The tether 70 is formed by an oblong or rectangularly shaped piece of material 72. Tether 70 includes a first end 74, a second end 76 and a middle region 78. Each of the reinforcement panels 50, the heat shield 60 and tether 70 additionally includes a plurality of fastener openings 34 located to coincide with the openings 32 in the rear panel 24. The fastener openings 32 in the tether 70 are located in each tether end 74 and 76. The other smaller openings near openings 32 are used as assembly aids. As can be appreciated, when the air bag module is assembled, the inflator studs are passed through aligned sets of fastener openings in the various panels including those in the panel forming the tether 70 of the complete air bag.

The rear panel 30 includes an inner side, face or surface 80 and an outer side, face or surface 82, see FIG. 1. In the illustrated embodiment, the inlet or neck region 83 of the rear panel proximate opening 32 is reinforced with two reinforcement panels 50, although none, one, or more can also be used. If the rear panel is sufficiently robust, the reinforcement panel(s) can be removed. As further described below, the reinforcement panels 50 are aligned one to the other and positioned adjacent the inner surface 80 with openings 52 in each reinforcement panel 50 aligned with opening 32. Also, the aligned reinforcement panels are oriented so their fastener openings 34 are in alignment with the fastener openings 34 of the rear panel.

Reference is again made to FIG. 1. As can be seen, the face panel 22 and rear panel 30 are shown separated from each other for the purpose of illustration but upon assembly the panels along the periphery are touching. As is known in the art, these panels are secured to each other by a peripheral sewn seam or seams 23.

Figure 4A:
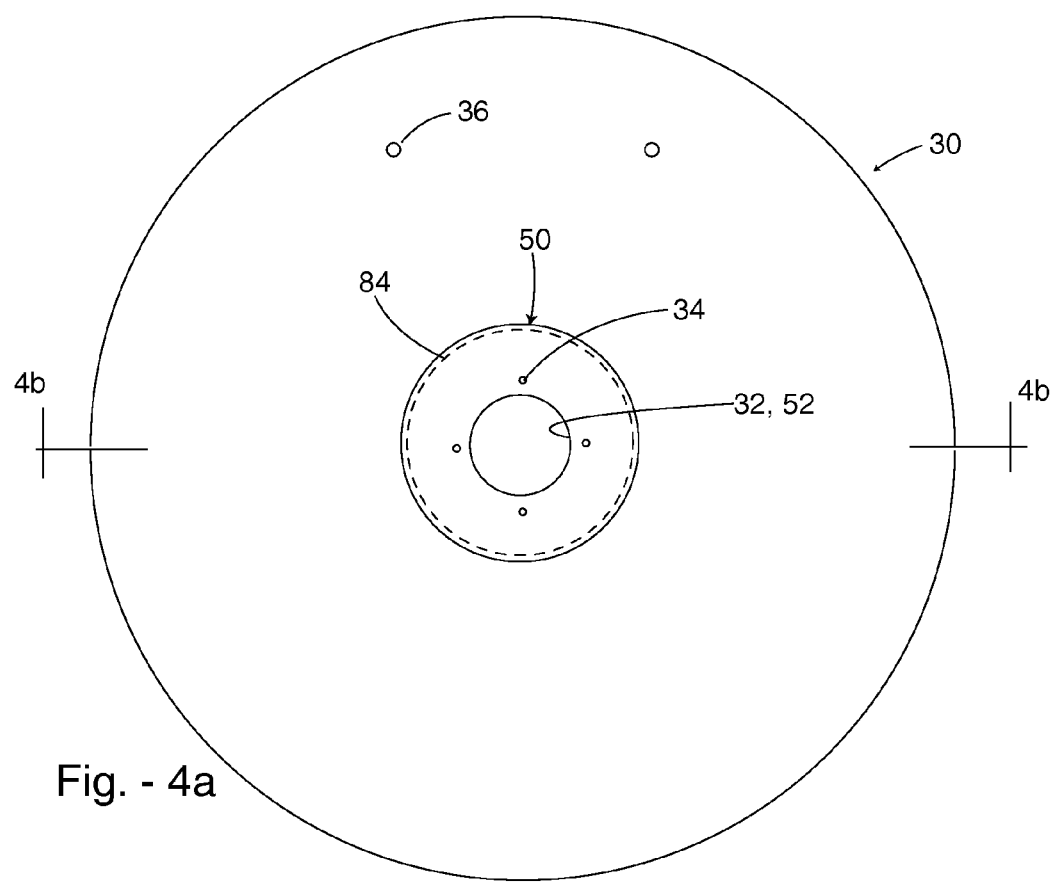
FIGS. 4a-4f show a series of views illustrating the construction of an air bag according to the present invention.
Figure 4B:
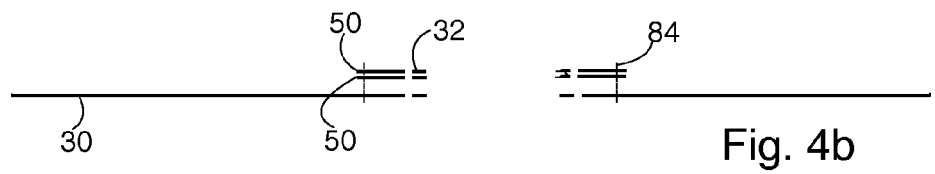

Reference is made to FIGS. 4a-4f, which illustrate various steps in the process of constructing the present air bag. FIGS. 4a, a top plan view, and 4b, a cross-sectional view, illustrate the rear panel 30 with two reinforcement panels 50, having a diameter of D1, aligned thereto so the center openings 32 and 52 and stud or fastener openings 34 overlay each other. With the reinforcement panel or panels 50 in the position as illustrated in FIG. 4a, they are sewn together by the sewn seam 84. As illustrated in FIG. 4a, seam 84 is circular. FIG. 4b is a cross-sectional view through section line 4b-4b.

Figure 4H:
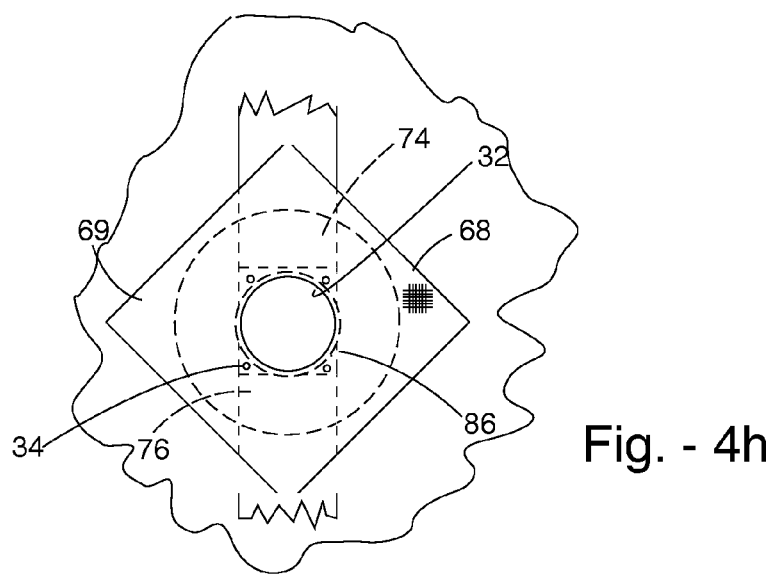
FIGS. 4h and 4i show alternate embodiments of the invention.
Figure 4C:
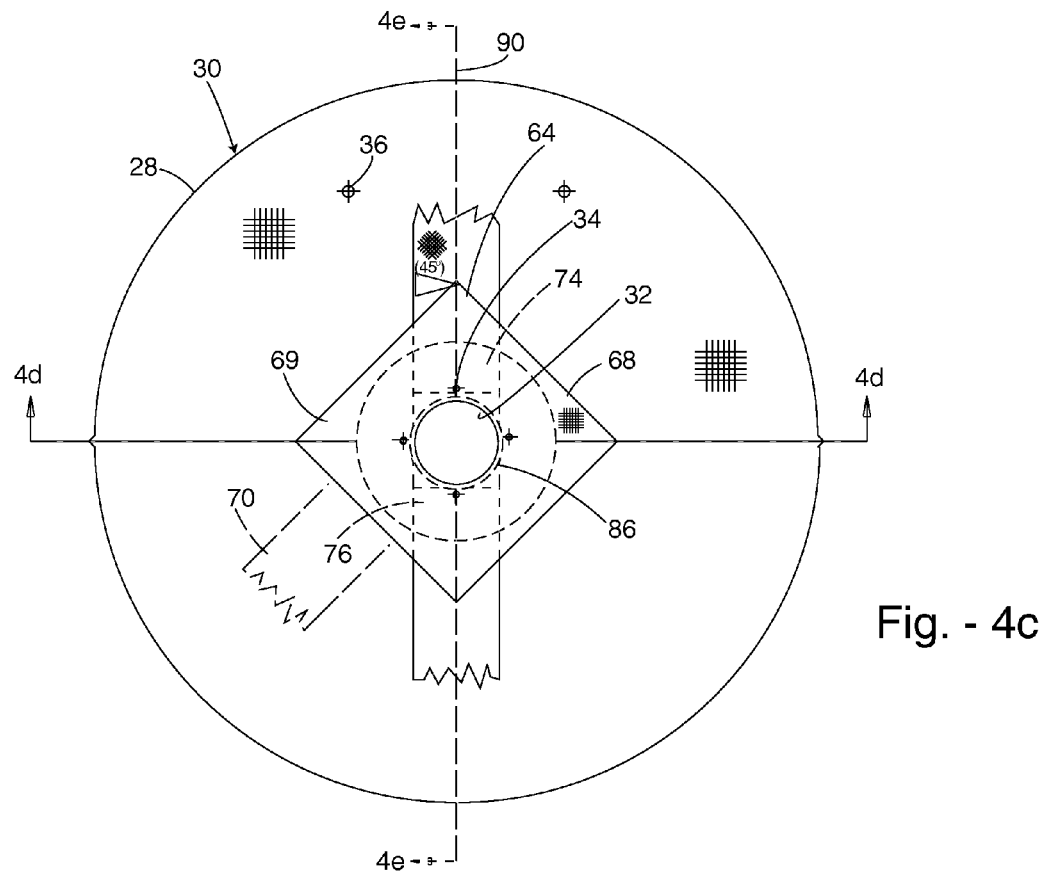
Figure 4D:
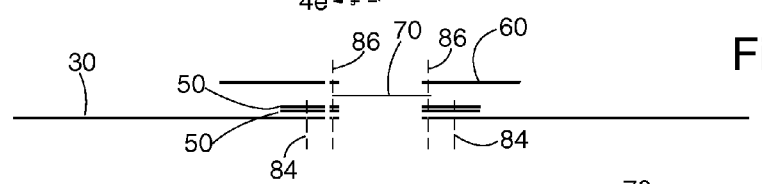

Reference is now made to FIGS. 4c and 4d, which show the attachment of the tether and heat shield to the rear panel. In FIG. 4c, the rectangular shaped tether is placed over the reinforcement panel(s) 50 and arranged so that end 74 of the tether is at a 12 o'clock position with its fastener hole 34 aligned with the fastener hole 32 of the reinforcement panel 50 that is also at the 12 o'clock position. In this orientation the end edge of end 74 is approximately tangent to the opening 52. Similarly, end 76 of tether 70 is aligned at the 6 o'clock position with its fastener opening 34 overlaying the corresponding 34 of the reinforcement panel(s) 50. In the illustrated embodiment the tether is aligned to a major axis (0 or 90°) of the rear panel, however, the tether can be set to any convenient angle between +/−0 to 180°. FIG. 4c shows the tether 70 in phantom line at another configuration. Reference is briefly made to FIG. 4h, which shows the stud hole locations, that is openings 32 in each panel turned 90°, so the horizontal and vertical centerlines of the cushion do not bisect the centerlines of the stud holes. It has been found that using this configuration effectively rotates the position of the inflator by 45 degrees and in some cases the inflator and folded air bag are more easily fit within a housing of the module.

Figure 4E:
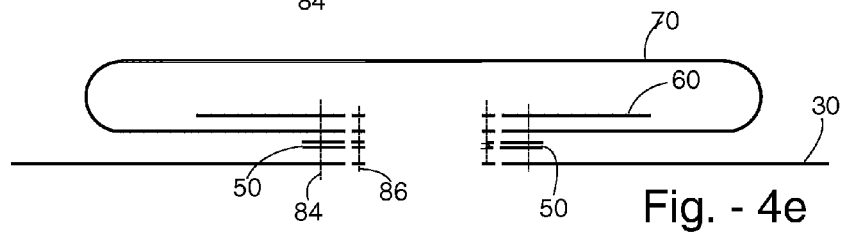

The above relationships as shown in FIG. 4c are also shown in FIGS. 4d and 4e. The tether ends are temporarily secured to the reinforcement panel (or to the rear panel if a reinforcement panel is not used) using an assembly fixture having upraised pins or the like that temporarily take the place of the studs 42 (not shown) of the inflator. The pins fit through the fastener holes of the various pieces of fabric. The assembly fixture can be as simple as a clip that holds the panel(s) together in proper alignment for assembly. With the tether ends in place, the heat shield 60 is placed over and aligned to the tether 70. In the illustrated embodiment the heat shield 60 is generally rectangular and more particularly square in shape and aligned to y-axis 90 (shown by the section line 4e-4e). A benefit of using the square heat shield is a savings in the amount of fabric used to make the air bag. When in position, the y-axis 90 bisects corner 64 of the heat shield 60 as shown in FIG. 4c. The heat shield is effectively rotated so that its four corners are above the normal X-Y axis orientation. The center opening 62 and fastener openings 34 of the heat shield are aligned to the opening 52 and openings 34 of the reinforcement panel(s). With the heat shield in the position as described, it and the tether ends 74 and 76 are secured to the reinforcement panel(s) 50 and rear panel 24 by a seam 86. In the illustrated embodiment seam 86 is circular and located internal to the fastener openings 34 and exterior to the center openings 32, 52 and 62.

During the inflation of the air bag, when inflation gas exits ports 44 of the inflator 40, the heat shield 60 will protect the tether ends 74 and 76. Further, by arranging heat shield 60 as described above, the remaining corners 68 and 69 of the heat shield extend outwardly from axis 90 and from the tether 70; this orientation permits the air bag to be folded into a more compact orientation than if the heat shield were rotated 90° relative to the y-axis 90 as shown in FIG. 4a. As can be appreciated, a heat resistant heat shield can in some applications be replaced by a sacrificial panel of fabric.

In the preferred embodiment of the invention each of the various panels is manufactured of woven fabric, often the same woven fabric. As illustrated in the various figures, weft and warp of the tether 70 is at a 45° bias to the weft and warp of the rear panel 30.

The assembly of the air bag 20 continues; the subassembly of the rear panel 30 and other panels is flipped upside-down so that the exterior side of the rear panel is visible. The exterior side of the face panel 22 is overlaid upon the rear panel and these two panels are sewn together by seam 23. Thereafter, the subassembly comprising all of the above panels, as described, is turned inside-out by pulling the face panel 22 through the aligned openings 32, 52 and 62 to achieve the orientation illustrated in FIG. 4f. At this point in the assembly process the center 78 of the tether 70 is not yet secured to any panel.

Figure 4F:
Figure 4G:
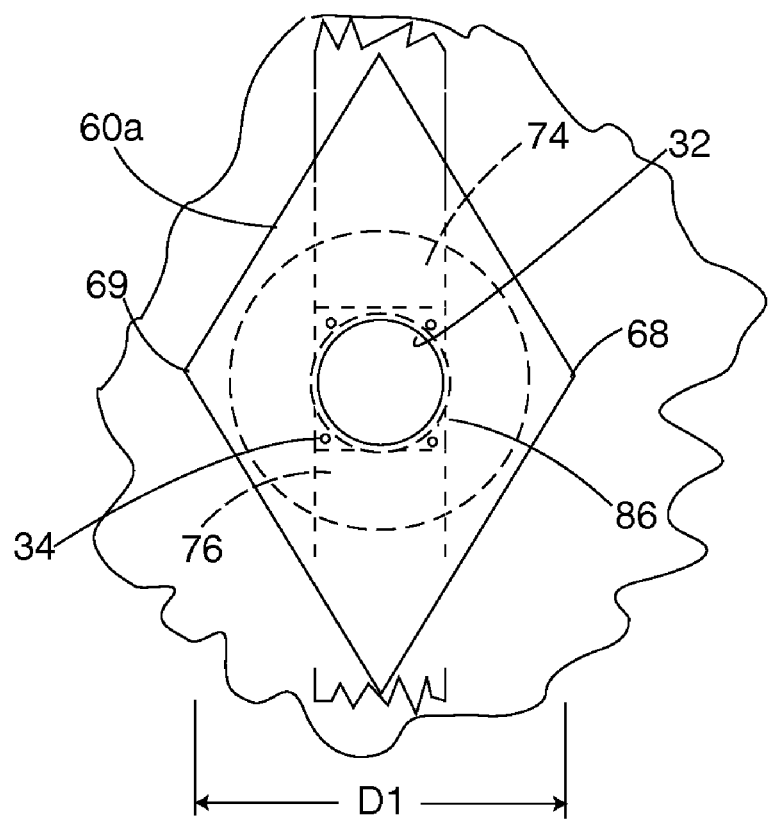
FIG. 4g is a partial view of a rear panel and shows another embodiment of the invention.
Figure 4I:
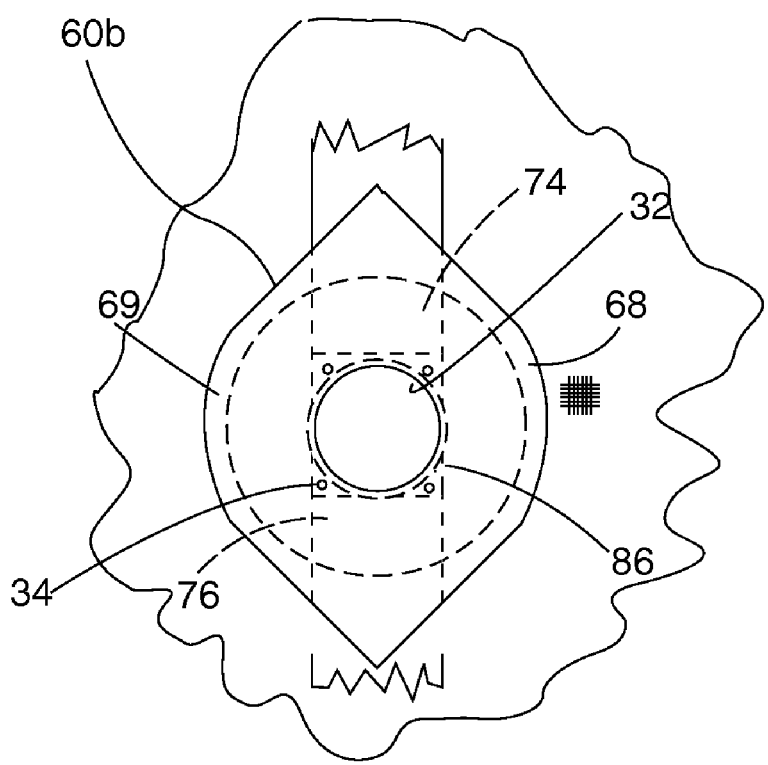

Access into the air bag tether 70 in the next assembly steps is obtained through the aligned openings 32, 52 and 62, hereafter referred to as 62. The subassembly of FIG. 4f is maneuvered so that the opening 62 is visible and atop the subassembly with the loose tether visible through opening 62. Reference is again made to FIG. 3, and more particularly the three sets of alignment marks 100, 102, and 104, respectively, and an optional marking 106 in the center portion of the tether 70. These alignment marks are used to properly secure the tether to the center of the face panel. As will be shown below, the sewing of the tether to the front panel is achieved through the inflator hole diameter 62 on the rear panel, but only after the cushion is inverted to its normal orientation. The center portion 78 of the tether 70 is pulled, tensing either one of the ends 74 or 76, and the center portion 78 is also aligned with axis 90. With the center portion of the tether 70 tensioned, the set of alignment marks 104 extends beyond the geometric center 22a of the face panel 22. The tether 70 is secured to the center or crown region 108 at or near the geometric center 22a of the face panel 22 by a circular seam 110 (see FIG. 3) that is centered about the geometric center of the face panel (see FIG. 1), using alignment hole 106 located within tether 70. The seam 110 extends to about 1 cm from either side of tether 70, also shown in FIG. 3.

Thereafter, the central region of tether 70 is folded over, see numerals 120 and 122, and formed into a Z-shape or fold pattern 124, which is secured to the crown or central portion of the face panel by an additional sewn seam 112. More particularly, the center portion of the tether 70 is first folded about the fold line or fold 120 extending across alignment hole set 104; this fold or fold line orients the tether to lie across that portion sewn by seam 110. Then tether 70 is folded, see number 122, across alignment holes 102; this fold 122 should place the circular alignment hole 106 over the center 22a of the face panel. As a check, the alignment hole set 100 should be located over the fold 122, which can be visually verified by the operator, or can be checked using a fixture with pins extending through the alignment holes. Thereafter, the tether is secured by a small diameter circular seam 112 that extends through the circular alignment mark 106 completing the construction of the air bag 20.

Optionally, the tether 70 can be finally secured to the crown portion of the face panel by using a box, square or circular stitch pattern 112, which extends through the face panel and Z-shaped fold in the tether 70.

Reference is made to FIGS. 4-h and 4-l, which show alternate configurations of a heat shield. The heat shield 60a of FIG. 4h is more diamond-like in shape with a minor diameter measured across corners 68 and 69 about or equal to diameter D1 of the reinforcement panel. The major diameter of heat shield 60a is larger than D1. In FIG. 4-i the top and bottom corners and portions of the heat shield 60b are triangular in shape while the medial portions are circular of diameter D1; in this way heat shield 60b covers the area covered or that would be covered by a reinforcement panel.

Many changes and modifications in the above-described embodiment of the invention can, of course, be carried out without departing from the scope thereof. Accordingly, that scope is intended to be limited only by the scope of the appended claims.

The invention claimed is:

1. An air bag (20) usable to protect the driver of the vehicle comprising:
   a face panel (22);
   a rear panel (30) of generally the same shape as the face panel and secured to the face panel along its periphery;
   the rear panel including a centrally located opening (32) configured to receive an air bag inflator that introduces gas into the space formed by the face and rear panels;
   a tether (70) of elongated shape having first (74) and second (76) ends and a center region (78), the center region is secured to the face panel proximate a geometric center of the face panel;

wherein the center region of the tether is formed into a Z-shaped configuration, portions of which are secured to the face panel.

2. The air bag according to claim 1 wherein the tether (70) is of one-piece construction.

3. The air bag according to claim 1 wherein the first and second ends of the tether are secured to the rear panel proximate the centrally located opening.

4. The air bag according to claim 3 further including an annular shaped reinforcement panel (50) secured to the rear panel and located on a side or surface of the rear panel that does not include the first and second end.

5. The air bag according to claim 4 further including a heat shield (60) secured to the rear panel and overlaying the first and second ends of tether.

6. The air bag according to claim 5 wherein the heat shield (60) is rectangularly shaped having at least a first and a second corner diagonally opposite one another and wherein the first corner of the heat shield is configured to overlay the first end of the tether and the second corner of the heat shield is configured to overlay a second end of the tether.

7. The air bag according to claim 5 wherein the heat shield is fabricated of a heat-resistant material.

8. An air bag (20) usable to protect the driver of the vehicle comprising:
 a face panel (22);
 a rear panel (30) of generally the same shape as the face panel and secured to the face panel along its periphery;
  the rear panel including a centrally located opening (32) configured to receive an air bag inflator that introduces gas into the space formed by the face and rear panels;
 a tether (70) of elongated shape having first (74) and second (76) ends secured about the centrally located opening to the rear panel and a center region (78), the center region is configured into a Z-shaped configuration via access through the centrally located opening and secured to the face panel proximate a geometric center of the face panel.

9. The air bag according to claim 8 wherein first and second ends of the tether are oppositely positioned about the centrally located opening of the rear panel.

10. A method of assembling an air bag of the type having a face panel, a rear panel, a tether of elongated shape having a first and a second end and a center region, the steps comprising:
 a) securing the first and second ends of the tether to the rear panel opposite one another about the centrally located opening;
 b) joining the face and rear panels together along a joint or seam at their aligned peripheries;
 c) inverting the air bag by pulling the face panel through the centrally located opening;
 d) manipulating the tether so it is positioned beneath the centrally located opening;
 e) securing the center region of the tether to the face panel; and
 f) manipulating the center region of the tether into a Z-shaped configuration;
 g) accessing the Z-shaped configuration below the centrally located opening and
 h) securing the Z-shaped configuration to the face panel.

* * * * *